(12) United States Patent
Griffin et al.

(10) Patent No.: US 10,216,012 B2
(45) Date of Patent: Feb. 26, 2019

(54) WEARABLE ACCESSORY WITH AN INNER CHAMBER

(71) Applicants: Kevin Slate Griffin, Raleigh, NC (US); Timothy R. Dexter, Angier, NC (US)

(72) Inventors: Kevin Slate Griffin, Raleigh, NC (US); Timothy R. Dexter, Angier, NC (US)

(73) Assignee: Kevin Slate Griffin, Raleigh, NC (US)

( * ) Notice: Subject to any disclaimer, the term of this patent is extended or adjusted under 35 U.S.C. 154(b) by 0 days.

(21) Appl. No.: 15/495,934

(22) Filed: Apr. 24, 2017

(65) Prior Publication Data
US 2017/0307908 A1    Oct. 26, 2017

Related U.S. Application Data

(60) Provisional application No. 62/327,030, filed on Apr. 25, 2016.

(51) Int. Cl.
*G02C 13/00*    (2006.01)
*G02C 3/00*    (2006.01)
(Continued)

(52) U.S. Cl.
CPC .......... *G02C 13/006* (2013.01); *A01K 23/005* (2013.01); *A01K 27/003* (2013.01);
(Continued)

(58) Field of Classification Search
CPC ...... G02C 3/006; G02C 11/00; G02C 13/006; A01K 23/005; A01K 27/003; A01K 27/008; A45F 5/00; B08B 1/006
(Continued)

(56) References Cited

U.S. PATENT DOCUMENTS 1,771,427 A * 7/1930 Waterhouse ......... A44C 5/2019
                                                    24/374
3,283,717 A * 11/1966 Balch ....................... G08B 5/40
                                                    102/344
(Continued)

FOREIGN PATENT DOCUMENTS

WO    2001/81984 A1    11/2001

OTHER PUBLICATIONS

Esty webpage https://www.etsy.com/listing/202212962/secret-message-locket-secret-compartment for Chanchala "Secret Message Locket, Secret Compartment Necklace, Steampunk Locket, Message in a Bottle, Perfume" on sale since 2014.*
(Continued)

*Primary Examiner* — Zachary W Wilkes
*Assistant Examiner* — George G King
(74) *Attorney, Agent, or Firm* — Kilpatrick Townsend & Stockton LLP

(57) ABSTRACT

A wearable accessory can include one or more retainer arms and a housing. The one or more retainer arms can couple to a wearable article. The housing can define an inner chamber that is sized for receiving component that is coupled to the one or more retainer arms. The housing can move between a closed position and an open position. The housing can protect the component from the environment external to the chamber in the closed position and reveal the component to the environment external to the chamber in the open position.

17 Claims, 16 Drawing Sheets

(51) Int. Cl.
*A45F 5/00* (2006.01)
*G02C 11/00* (2006.01)
*B08B 1/00* (2006.01)
*A01K 23/00* (2006.01)
*A01K 27/00* (2006.01)

(52) U.S. Cl.
CPC .............. *A01K 27/008* (2013.01); *A45F 5/00* (2013.01); *B08B 1/006* (2013.01); *G02C 3/006* (2013.01); *G02C 11/00* (2013.01)

(58) Field of Classification Search
USPC ................................ 351/157; 63/1.14, 13, 18
See application file for complete search history.

(56) References Cited

U.S. PATENT DOCUMENTS

| | | | | |
|---|---|---|---|---|
| 4,854,449 A | * | 8/1989 | Fitzhugh | A44B 15/005 15/214 |
| 4,937,920 A | * | 7/1990 | Tsai | A44C 5/00 24/3.2 |
| 4,953,695 A | | 9/1990 | Tallman | |
| 5,014,846 A | | 5/1991 | Walker et al. | |
| 5,157,425 A | | 10/1992 | Liu et al. | |
| 5,366,072 A | | 11/1994 | Goldenberg | |
| 5,575,042 A | | 11/1996 | Kalbach et al. | |
| 5,593,024 A | * | 1/1997 | Seiler | G02C 3/003 206/5 |
| 5,694,659 A | * | 12/1997 | Merrion | G02C 13/006 15/104.93 |
| 5,735,393 A | | 4/1998 | Shiue et al. | |
| 6,131,209 A | | 10/2000 | Thayer et al. | |
| 6,709,100 B2 | | 3/2004 | Kalbach | |
| 7,467,867 B1 | | 12/2008 | Williams et al. | |
| 8,092,009 B2 | | 1/2012 | Williams | |
| 2002/0117406 A1 | * | 8/2002 | Horesh | G02C 3/003 206/37 |
| 2005/0231681 A1 | * | 10/2005 | Spitzer | G02C 3/003 351/122 |
| 2012/0069511 A1 | * | 3/2012 | Azera | G06F 1/163 361/679.03 |
| 2014/0354939 A1 | * | 12/2014 | Walicki | G02C 3/003 351/43 |

OTHER PUBLICATIONS

Amazon webpage https://www.amazon.com/Hides-Classic-Eyewear-Retainer-Cleaner/dp/B005O65BXG for Hides "Hides Classic Eyewear Retainer Case and Cleaner" on sale since 2013.*
PCT/US2017/029218, International Search Report and Written Opinion dated Jul. 27, 2017.

* cited by examiner

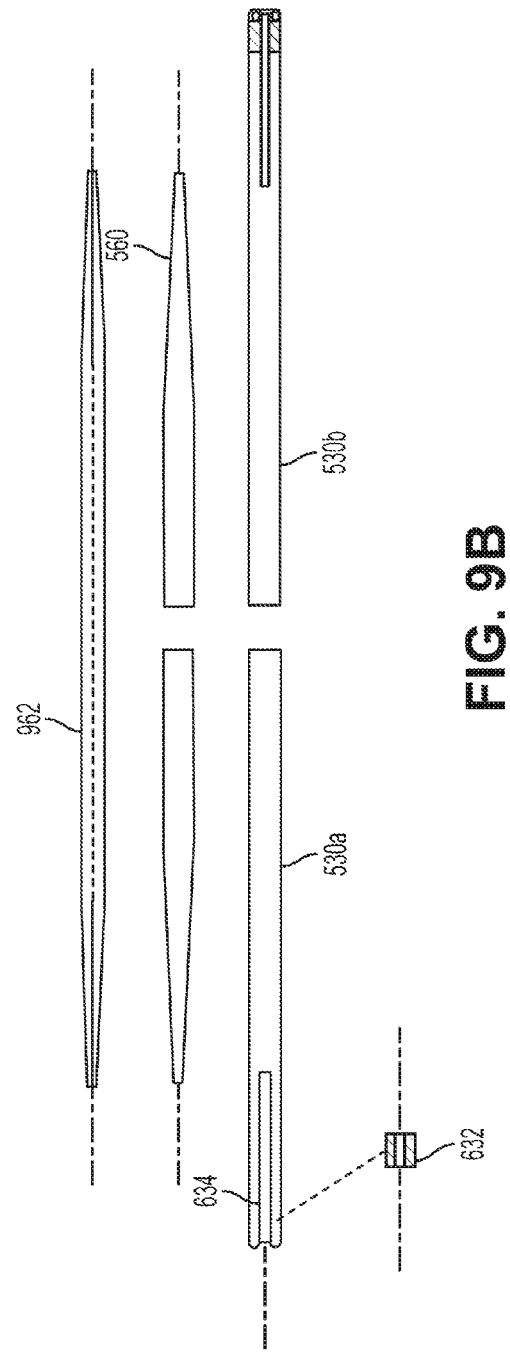
FIG. 9A
FIG. 9B

WEARABLE ACCESSORY WITH AN INNER CHAMBER

CROSS REFERENCE TO RELATED APPLICATIONS

This disclosure is related to and claims the benefit of priority of U.S. Provisional Application No. 62/327,030, titled "Eyewear Retainer with Cleaning Cloth" and filed on Apr. 25, 2016, which is hereby incorporated in its entirety by this reference.

TECHNICAL FIELD

The present disclosure relates to accessories for eyewear and other wearables and more particularly (although not necessarily exclusively), to a wearable accessory with an inner chamber.

BACKGROUND

Eyewear can include lens that develop a film or residue that can obstruct the vision of a wearer. The film or residue may form based on the lens being exposed to environmental conditions. In one example, sand from a beach may attach to lens of sunglasses being worn by a beach volleyball player. In this example, the beach volleyball player may have limited pockets or wearable compartments for storing a cloth to clean the lens. In another example, moisture may attach to the lens of sunglasses worn by a golf player. In this example, a cloth for cleaning the lens stored in a pocket of the golfer may become less effective at wiping moisture from the glasses by remaining exposed to environmental conditions (e.g., humidity and sweat).

SUMMARY

Aspects and examples are disclosed for a wearable accessory with an inner chamber.

In some aspects, a wearable accessory is disclosed. The wearable accessory can include one or more retainer arms and a housing. The one or more retainer arms can couple to a wearable article. The housing can define a chamber that is sized for receiving a component that is coupled to the retainer arms. The housing can be moved from a closed position to an open position. The housing can protect the component from an environment external to the chamber in the closed position and reveal the component to the environment external to the chamber in the open position.

In additional or alternative aspects, a wearable is disclosed. The wearable can include a wearable article, one or more retainer arms, and a component. The retainer arms can be coupled to the wearable article and the component can be coupled to the retainer arms. The component can be received in a chamber defined by a housing that can move from a closed position to an open position. The component can be protected from an environment external to the chamber in the closed position and revealed to the environment external to the chamber in the open position.

In additional or alternative aspects, an eyewear retainer is disclosed. The eyewear retainer can include a first retainer arm, a second retainer arm, a cleaning cloth, and a housing. The first retainer arm can be coupled to a first eyewear retainer arm of an eyewear. The second retainer arm can be coupled to a second eyewear retainer arm of the eyewear. The cleaning cloth can be coupled to the first retainer arm and the second retainer arm and the cleaning cloth can be for cleaning the eyewear. The housing can define a chamber and be moved between a closed position and an open position. The housing can protect the cleaning cloth from an environment external to the chamber in the closed position and reveal the cleaning cloth to the environment external to the chamber in the open position.

These illustrative examples are mentioned not to limit or define the invention, but to aid understanding thereof. Other aspects, advantages, and features of the present invention will become apparent after review of the entire description and figures, including the following sections: Brief Description of the Figures, Detailed Description, and Claims.

BRIEF DESCRIPTION OF THE DRAWINGS

FIG. 9A is a cross-sectional side view of retainer arms of a wearable accessory with an inner chamber according to one aspect of the present disclosure.

FIG. 9B is an exploded cross-sectional side view of the retainer arms in FIG. 9A according to one aspect of the present disclosure.

DETAILED DESCRIPTION

Figure 1:
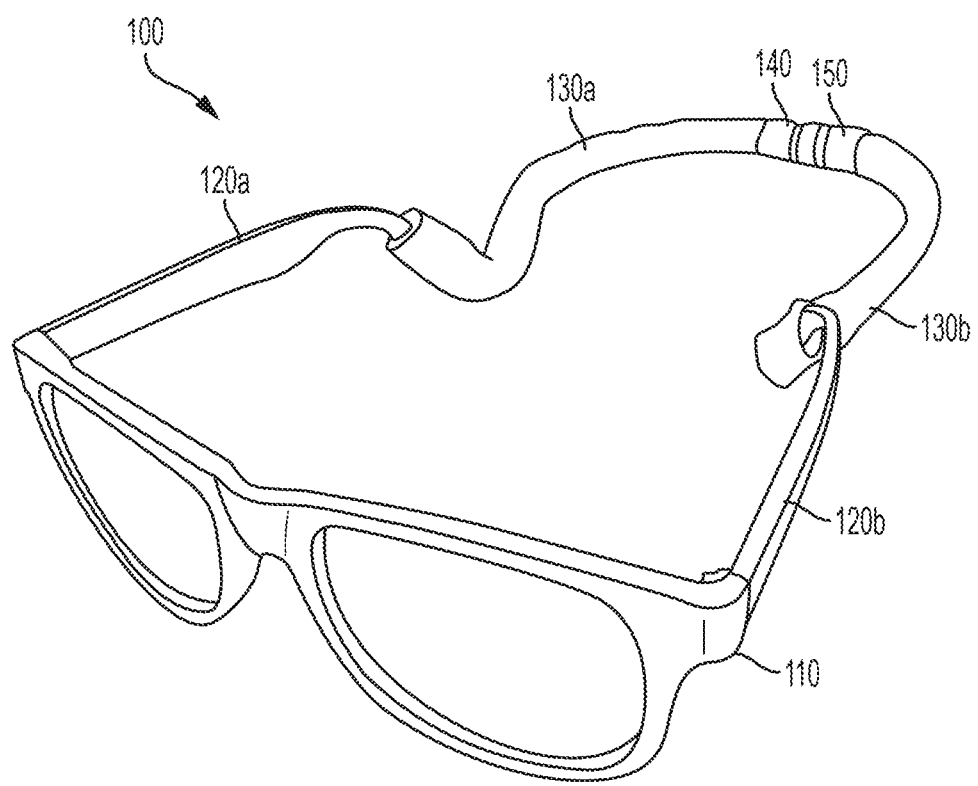
FIG. 1 is a perspective view of an example of an eyewear retainer that includes a housing in a closed position for concealing an inner chamber according to one aspect of the present disclosure.

Certain aspects and features relate to a wearable accessory with an inner chamber. In some examples, the wearable accessory can include an eyewear retainer for holding eyewear on a wearer that includes a housing that defines an inner chamber for housing a cleaning cloth. The housing can move between a closed position and an open position. In the closed position, the housing protects the cleaning cloth from the environment external to the inner chamber. In the open position, the housing reveals the cleaning cloth for being used to clean the lens of the eyewear. In additional or alternative examples, the wearable accessory can include one or more retainer arms for coupling to any suitable wearable article (e.g., a leash, a belt, a wallet chain, a necklace, or a bracelet). The wearable accessory can include a housing with a chamber for protecting any suitable component e.g., (a doggy bag, a notepad, or identification documents) from an environment external to the chamber in a closed position and allowing the component to be accessed in an open position.

In some aspects, the housing can include two portions that are coupled together in the closed position and separate in the open position. The portions can be coupled to a retainer arm. One portion can be a male portion and the other portion can be a female portion such that the male portion is positionable within the female portion in the closed position. The portions can be pulled apart to move from the closed position to the open position and to reveal the component. In additional or alternative aspects, the housing can be lockable such that a key or a combination is required to move the housing from a closed position to an open position. In additional or alternative aspects, the component can be detached or removed from the housing when the housing is in the open position.

The housing can include a water resistant material that can substantially seal or protect the component when the housing is in the closed position. For example, the housing can be made of a waterproof, breathable fabric membrane, such as neoprene or a GORE-TEX material, and the housing can be positioned around the component to create a protective barrier. The housing can include a buoyant material for causing the wearable article to float in water.

In additional or alternative aspects, the housing can be a tubular cover having an inner chamber with a pair of openings. The openings can allow the housing to slide around the component and can substantially seal the component from external substances when the component is within the inner chamber. In some examples, the component can be coupled between two retainer arms to create a continuous string. The openings can constrict when the component is within the inner chamber of the tubular cover. The openings can be responsive to a sliding force by enlarging for allowing the component to exit the inner chamber through one opening and a portion of a retainer arm to enter the inner chamber through another opening.

In some aspects, the housing can include a tab coupled to the housing to facilitate sliding the housing between a position for protecting the component and a position for revealing the component. The tab can extend from an external surface of the housing such that a user can grip the tab and pull the housing between positions. In additional or alternative aspects, pulling the tab can enlarge the openings in the housing to facilitate passing the component and retainer arm therethrough. In additional or alternative aspects, the housing can include more than one tab.

In additional or alternative aspects, one or more retainer arms can include the housing. For example, one of the retainer arms can define the inner chamber. The retainer arm can include a slit forming a passage between the inner chamber and an environment external to the retainer arm. A component can be positioned in the inner chamber. A tab can be coupled to the component and can move from an open position to a closed position. In the closed position, a portion of the tab can be positioned in the slit and seal the inner chamber from environmental conditions. The tab can be moved from the closed position to an open position by pulling the tab away from the retainer arm such that a portion of the component is pulled through the slit and into the environment external to the retaining arm.

The component can include any suitable object. In some aspects, the component can include a cleaning cloth with one or more pockets for facilitating a user in cleaning an eyewear. In some examples, the cleaning cloth can be rectangular with pockets on opposite sides such that a user can insert one or more fingers, where a finger can include a thumb, into the pockets and pinch the eyewear between the cloth. In additional or alternative examples, the cleaning cloth can be triangular with a pocket on one corner to facilitate cleaning the eyewear. In additional or alternative aspects, the component can include any objects a user desires to keep close. For example, the component can include identification documents, money, or medication.

These illustrative examples are given to introduce the reader to the general subject matter discussed here and are not intended to limit the scope of the disclosed concepts. The following sections describe various additional features and examples with reference to the drawings in which like directional descriptions are used to describe the illustrative aspects but, like the illustrative aspects, should not be used to limit the present disclosure.

FIGS. 1-4 are a perspective views of an example of an eyewear retainer 100 that includes a housing for revealing or concealing an inner chamber. The eyewear retainer 100 can include a first retainer arm 130a, a female portion 140 of the housing, a male portion 150 of the housing, a second retainer arm 130b, and a cleaning cloth 160. The first retainer arm 130a can have a first end coupled to an eyewear arm 120a of an eyewear 110. A second end of the first retainer arm 130a can be coupled to the female portion 140. The second retainer arm 130b can have a first end coupled to an eyewear arm 120b of the eyewear 110. A second end of the second retainer arm 130b can be coupled to the male portion 150. The female portion 140 and the male portion 150 can define an inner chamber in which the cleaning cloth 160 can be positioned.

In FIG. 1, the eyewear retainer 100 is depicted in a closed position such that the male portion 150 is partially positioned within the female portion 140 and frictionally coupled to seal the inner chamber of the housing from an environment external to the housing. The environment external to the housing can include various characteristics that the housing may seal from the inner chamber. In some examples, the seal can be a fluid seal to prevent moisture or liquids (e.g., sweat or chemicals) in the environment external to the housing from penetrating the housing and contacting the cleaning cloth 160. In other examples, the seal can prevent debris (e.g., dirt or sand) from penetrating the housing and contacting the cleaning cloth 160.

Figure 2:
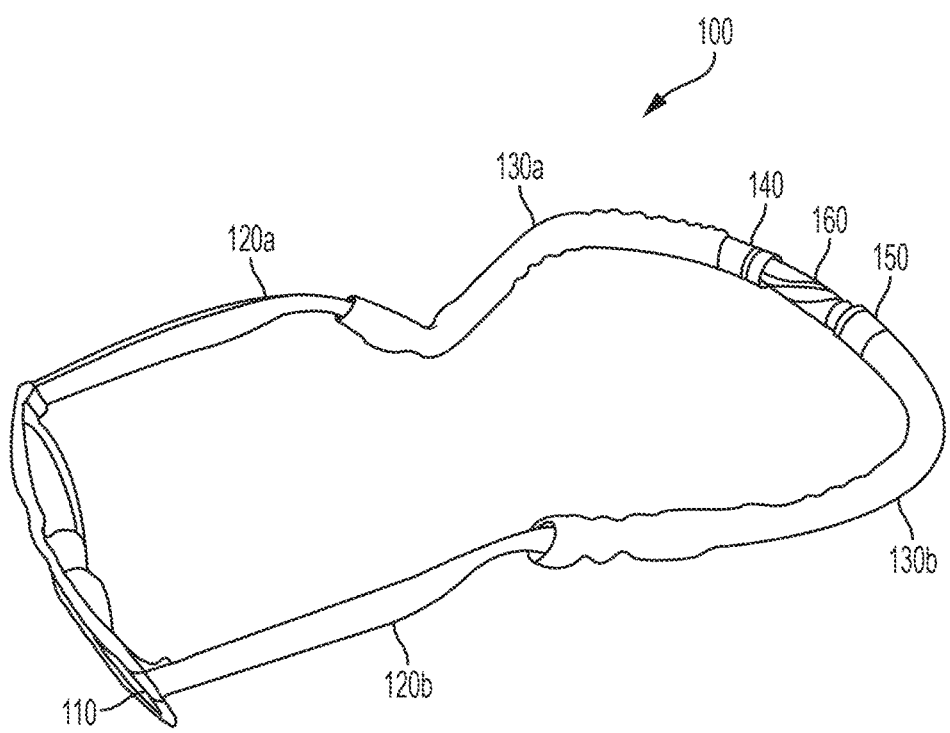
FIG. 2 is a perspective view of an example of an eyewear retainer that includes a housing in an open position for partially revealing a cleaning cloth according to one aspect of the present disclosure.
Figure 3:
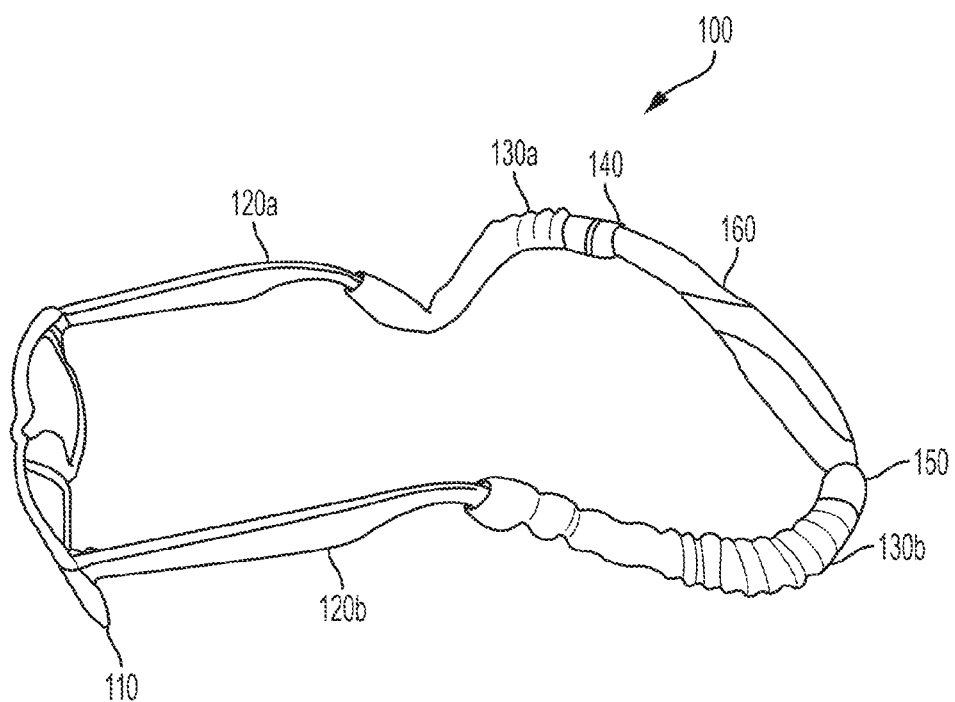
FIG. 3 is a perspective view of an example of an eyewear retainer that includes a housing in an open position for fully revealing a cleaning cloth according to one aspect of the present disclosure.
Figure 4:
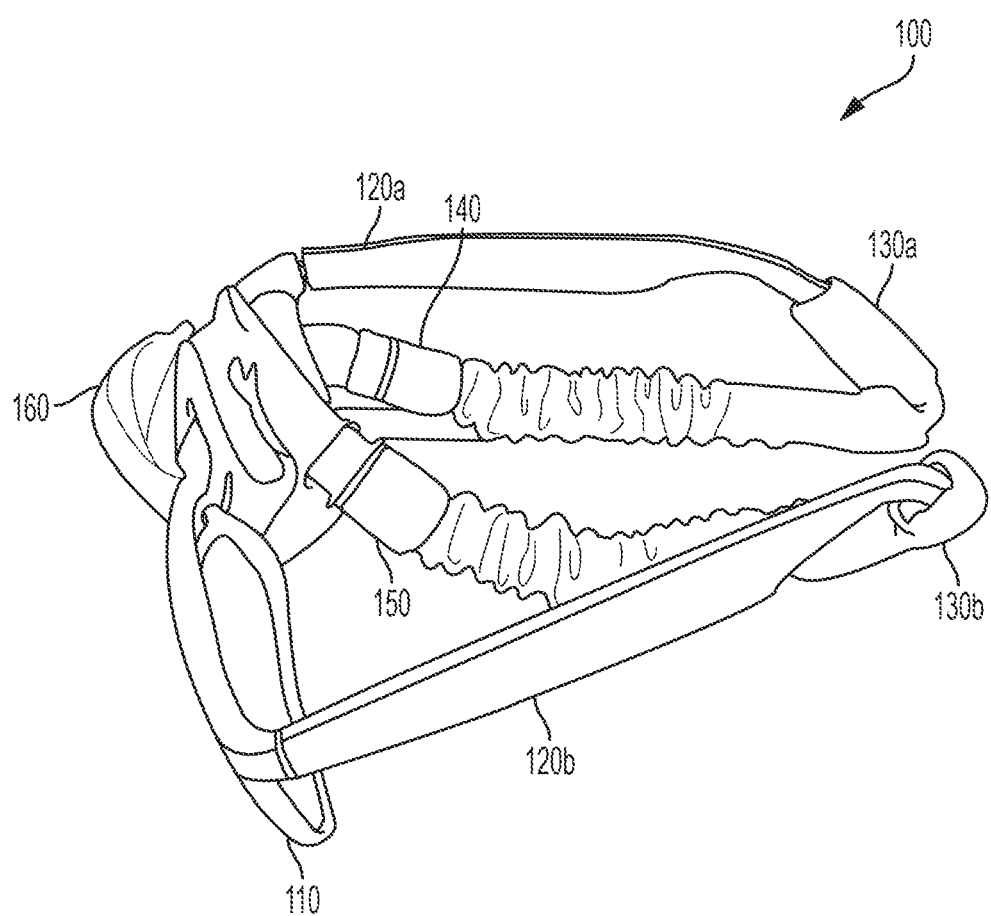
FIG. 4 is a perspective view of an example of an eyewear retainer that includes a housing in an open position for revealing a cleaning cloth for cleaning glasses according to one aspect of the present disclosure.

In FIG. 2, the eyewear retainer 100 is depicted in an open position with the cleaning cloth 160 partially revealed. The male portion 150 of the housing is separated from the female portion 140 of the housing. In this example, the retainer arms 130a-b define a portion of the inner chamber and the cleaning cloth 160 is coupled to a flexible material extending through a portion of the inner chamber defined by the retainer arms 130a-b. The retainer arms 130a-b are axially compressed in response to the male portion 150 being separated from the female portion 140. In FIG. 3, the eyewear retainer 100 is depicted with the cleaning cloth 160 fully revealed. The retainer arms 120a-b are further axially compressed in response to the male portion 150 being further separated from the female portion 140. In FIG. 4, the eyewear retainer 100 is depicted in an open position with the cleaning cloth 160 fully revealed and positioned to clean a lens of the eyewear 110.

Although the eyewear retainer 100 in FIGS. 1-4 is depicted as a wearable accessory that can be separated from the eyewear 110, other implementations are possible. In some examples, the eyewear 110 can be manufactured with the eyewear retainer 100 as a single contiguous wearable. In some aspects, the eyewear retainer 100 can be used with other types of eyewear including goggles, monocles, or prescription glasses. In some aspects, the housing has symmetrical portions or substantially similar portions that can reveal a component in an open position and protect the component in a closed position.

In some aspects, an eyewear retainer can include one or more than two retainer arms. In some examples, an eyewear retainer can include a single retainer arm such that both ends of the retainer arm can be coupled to an eyewear to create a loop. One end of the retainer arm can be coupled to an arm of the eyewear and a second end of the retainer arm can be coupled to another arm of the eyewear. The loop formed by the retainer arm can be used to hold the eyewear 110 on a wearer. The cleaning cloth 160 can be coupled to, and wrap around, the single retainer arm. In additional or alternative examples, an eyewear retainer can include two retainer arms that can include one end that can couple to an eyewear and a second end that can couple to a cleaning cloth such that a loop is formed.

In other aspects, the eyewear retainer 100 can be a wearable accessory used with other wearable articles. For example, one of the retainer arms 130a-b can couple to an animal collar and the other one of the retainer arms 130a-b can couple to a leash handle to form an animal leash with an inner chamber. In additional or alternative aspects, the wearable accessory can provide a protective inner chamber for a belt, a necklace, or a bracelet.

Figure 5:
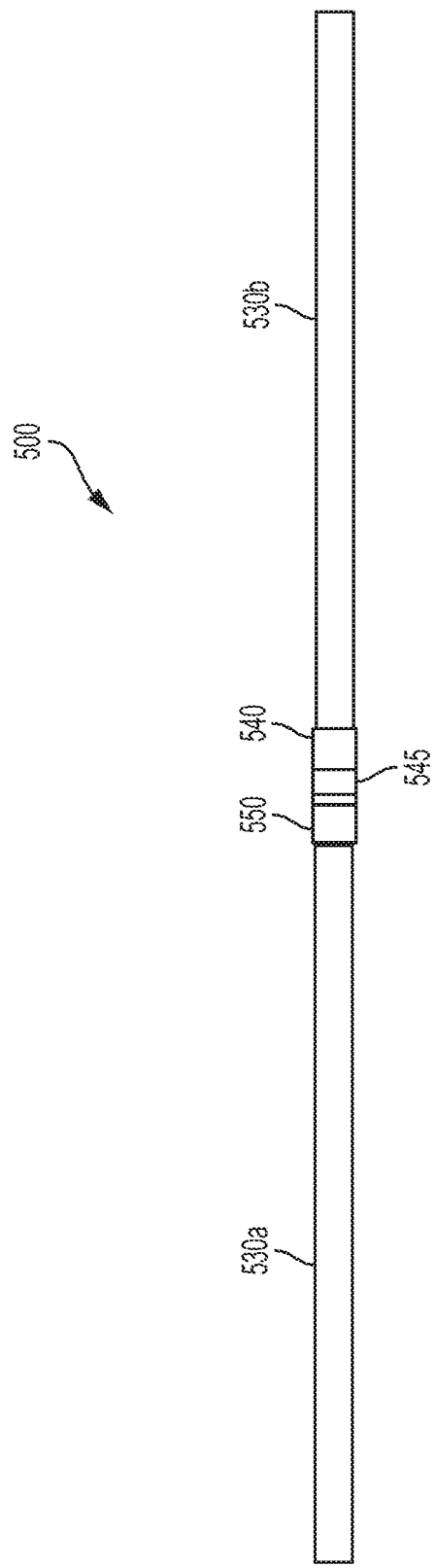
FIG. 5 is a side view of a wearable accessory in a closed position with an inner chamber according to one aspect of the present disclosure.

FIG. 5 is a side view of a wearable accessory 500 in a closed position with an inner chamber. The wearable accessory 500 can include two retainer arms 530a-b, and a housing 545. The housing 545 includes a female portion 540, and a male portion 550.

Figure 6:
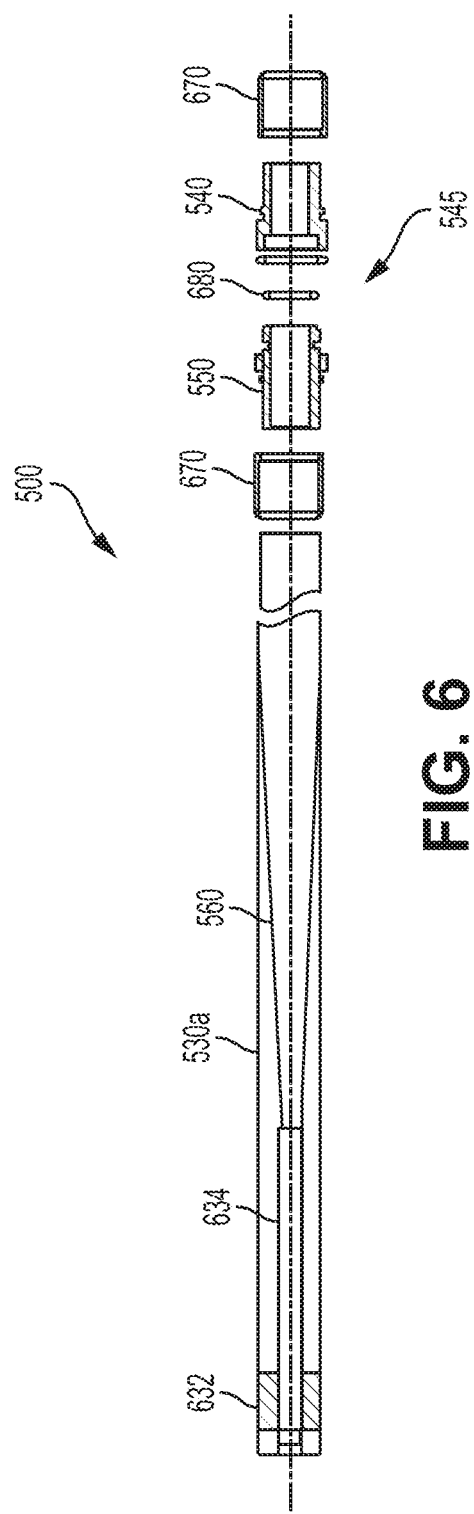
FIG. 6 is an exploded cross-sectional side view of a wearable accessory with an inner chamber according to one aspect of the present disclosure.

FIG. 6 is an exploded cross-sectional side view of part of the wearable accessory 500. The wearable accessory 500 can include a housing 545 coupled to a retainer arm 530a. The housing 545 can include coupling portions 670, a female portion 540, a male portion 550, and an o-ring 680. The coupling portions 670 can couple the male portion 550 to the retainer arm 530a and the female portion 540 to another retainer arm 530b (not depicted in FIG. 6).

The o-ring 680 can be positioned between the female portion 540 and the male portion 550 to form a seal in the closed position. In some aspects, the o-ring can have an inner width that is less than the outer width of the male portion 550. The o-ring can include a flexible material (e.g., rubber) and can be positioned in a depression in the outer surface of the male portion 550, such that the o-ring forms a projection from the surface of the male portion 550. The o-ring 680 can have an outer width that is greater than the inner width of the female portion 540. The male portion 550 can be positioned in the inner area of the female portion 540 such that the o-ring 680 is positioned in a depression in an inner surface of the female portion 540. The o-ring can form a fluid seal for preventing environmental conditions (e.g., moisture) from penetrating the housing and reaching the inner chamber in the closed position.

The retainer arm 530a can partially define two internal areas. One of the internal areas partially defined by the retainer arm 530a can include the inner chamber 560, which can also be partially defined by the housing 545. A component (e.g., a cleaning cloth or a roll of bags for picking up animal waste) can be positioned in this inner chamber 560 of the wearable accessory 500. The component can be revealed or concealed based on the position of the housing 545. For example, the component can be revealed or released from the inner chamber such that the component is accessible by a user while the housing 545 is in an open position. The component can be concealed or sheltered in the inner chamber such that the component is protected from environmental conditions while the housing 545 is in a closed position. The component can be coupled to an inner surface of the retainer arm 530a that defines the inner chamber 560.

Another internal area partially defined by the retainer arm 530a can include a retaining area 634. A portion of a wearable article can be positioned in the retaining area 634 and retained in the retaining area 634 by a retaining component 632. The retaining component 632 can expand to allow the portion of the wearable article to be positioned in the retaining area 634 and contract around the portion to frictionally couple the wearable accessory 500 to the wearable article. For example, an eyewear arm can be positioned in the retaining area 634 of the retainer arm 530a. The retaining component 632 can expand to allow an eyewear arm to be partially positioned in an inner area of the retainer arm 530a and contract around the eyewear arm to frictionally couple the wearable accessory 500 to the eyewear. The retaining component 632 can create a frictional seal protecting the retaining area 634 from the environment external to the retainer arm 530a.

Although the inner chamber 560 for housing the revealable component is depicted as part of the retaining area 634, other implementations are possible. For example, the retaining area 634 can be fluidly sealed from the inner chamber 560 by a portion of the retainer arm 530a being solid or a sealing device being positioned in the inner area of the retainer arm 530a. In some aspects, the retainer arm 530a is manufactured as a contiguous component of a wearable article.

Figure 7A:
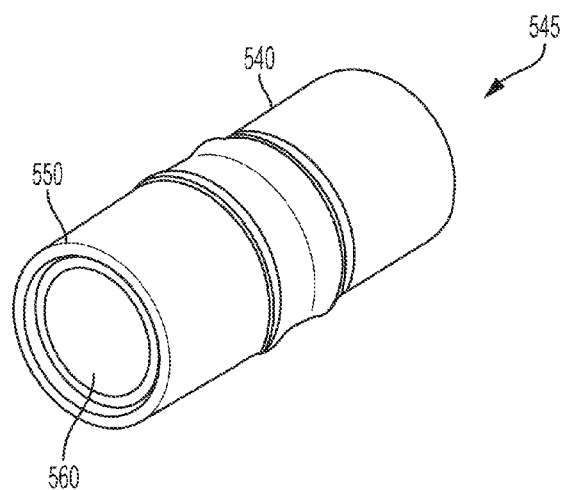
FIG. 7A is a perspective view of a housing that can couple or decouple to conceal or reveal an inner chamber of a wearable accessory according to one aspect of the present disclosure.
Figure 7B:
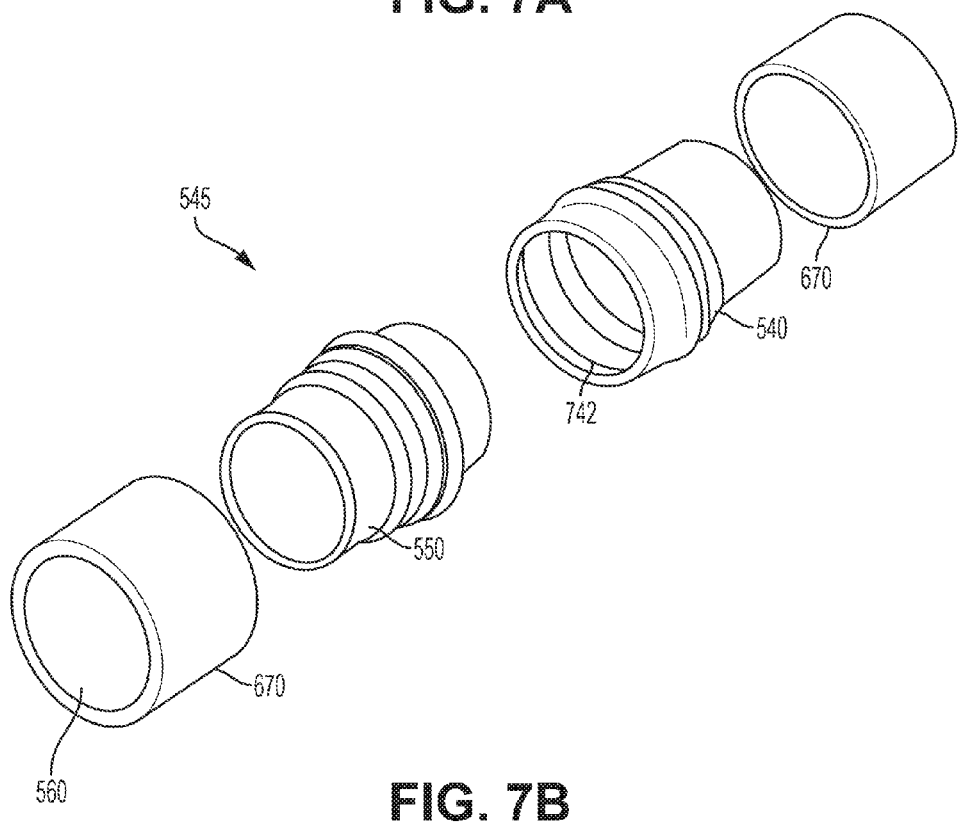
FIG. 7B is an exploded perspective view of the housing in FIG. 7A according to one aspect of the present disclosure.

FIGS. 7A-B and 8A-B are views of an example of a housing 545 that can couple or decouple to conceal or reveal an inner chamber 560. The housing 545 can include a female portion 540, a male portion 550, coupling portions 670, and an o-ring 680. The housing can partially define an inner chamber 560. The inner chamber 560 can protect a component positioned in the inner chamber from environmental conditions external to the housing while the housing is in a closed position. FIG. 7A is a perspective view of the housing 545 in a closed position. FIG. 7B is an exploded perspective view of the housing 545 in a closed position. In some examples, the female portion 540 can include a first end with an inner width that is larger than an outer width of a first end of the male portion 550 such that the male portion 550 is positionable within the female portion 540. In additional or alternative examples, the female portion 540 and the male portion 550 can include a second end with a smaller outer width than an inner width of the coupling portions 670 such that the female portion 540 and the male portion 550 can be positioned in and coupled to the coupling portions 670. The coupling portions 670 can couple to retaining arms (e.g., retaining arms 530a-b in FIG. 5).

Figure 8A:
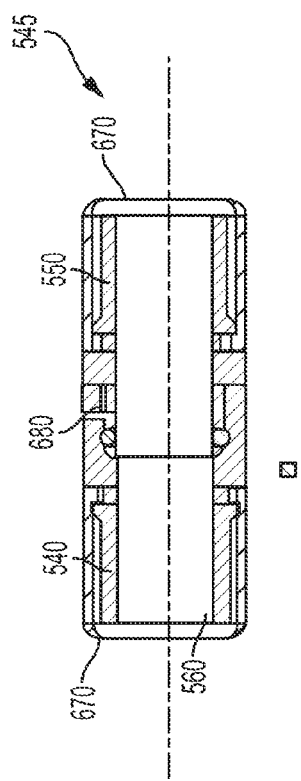
FIG. 8A is a cross-sectional side view of a housing that can couple or decouple to conceal or reveal an inner chamber of a wearable accessory according to one aspect of the present disclosure.
Figure 8B:
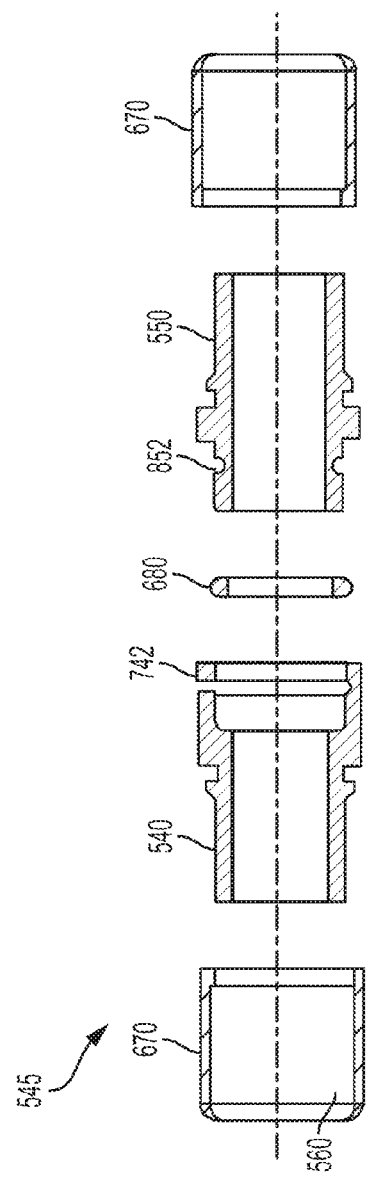
FIG. 8B is an exploded cross-sectional side view of the housing in FIG. 8A according to one aspect of the present disclosure.

FIG. 8A is a side view of the housing 545 in a closed position. FIG. 8B is an exploded side view of the housing 545 in a closed position. The o-ring 680 can be positioned between the female portion 540 and the male portion 550 to form a seal in the closed position. In some aspects, the o-ring can have an inner width that is less than the outer width of the male portion 550. The o-ring can include a flexible material (e.g., rubber) and can be positioned in a depression in the outer surface of the male portion 550, such that the o-ring forms a projection from the surface of the male portion 550. The o-ring 680 can have an outer width that is greater than the inner width of the female portion 540. The male portion 550 can be positioned in the inner area of the female portion 540 such that the o-ring 680 is positioned in a depression in an inner surface of the female portion 540. The o-ring can form a fluid seal for preventing environmental conditions (e.g., moisture) from penetrating the housing and reaching the inner chamber in the closed position.

FIGS. 9A-B are views of an example of retainer arms 530a-b of a wearable accessory with an inner chamber 560. FIG. 9A is a cross-sectional side view of the retainer arms 530a-b. FIG. 9B is an exploded cross-sectional side view of the retainer arms 530a-b. The retainer arms 530a-b include the inner chamber 560, retaining areas 634, and retaining components 632. The retaining arms 530a-b can couple to a wearable article by positioning portions of the wearable article in the retaining areas 634 and frictionally coupling to the portions with the retaining components 632. The inner chamber 560 can be further defined by a housing (e.g., the housing 545 in FIGS. 5-8B). A revealable component 962 can be positioned in the inner chamber 560. The revealable component 962 can be protected from environmental conditions such as moisture and dirt when the housing is in a closed position. The revealable component 962 can be revealed when the housing is in an open position.

Figure 10:
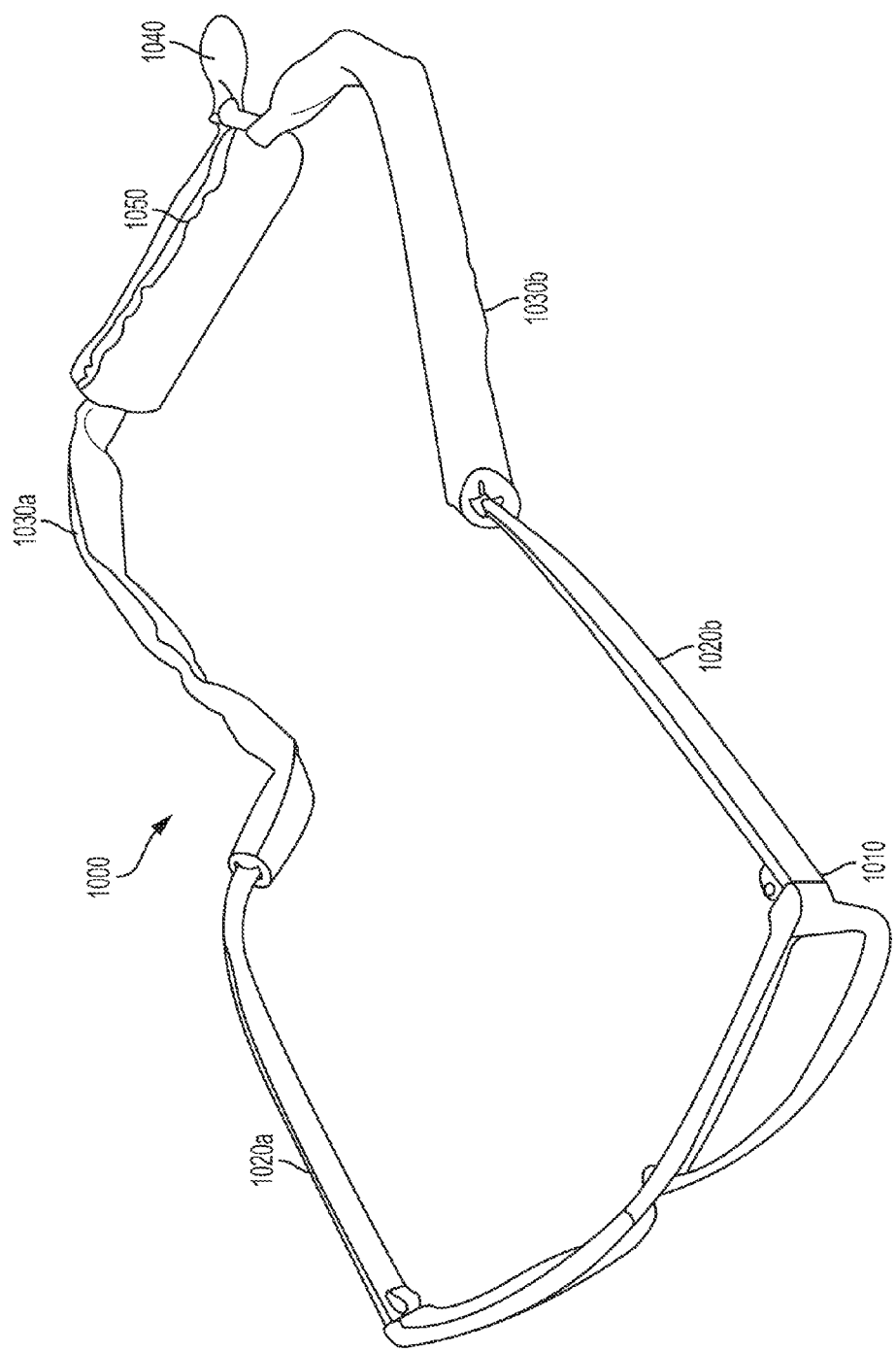
FIG. 10 is a perspective view of an eyewear retainer with a slideable cloth housing according to one aspect of the present disclosure.

FIG. 10 is a perspective view of an eyewear retainer 1000 with a cleaning cloth. The eyewear retainer 1000 includes two retainer arms 1030a-b, a cleaning cloth (not visible in FIG. 10), and a cloth housing 1050. The retainer arms 1030a-b are coupled to an eyewear arm 1020a-b of an eyewear 1010 and to the cleaning cloth housed within the cloth housing 1050. The cloth housing 1050 is in a protective position such that it covers the cleaning cloth, which can be moved to a second position such that the cleaning cloth can be revealed and used to clean the eyewear 1010. The cloth housing 1050 can include a tab 1040 that can facilitate moving the cloth housing 1050 between the protective position and the second position. A user can grip the tab 1040 and pull the cloth housing 1050 such that the cloth housing 1050 slides around a portion of one of the retainer arms 1030a-b.

Although FIG. 10 illustrates the eyewear retainer 1000 with two retainer arms 1030a-b, an eyewear retainer 1000 can include one or more than two retainer arms. For example, a single retainer arm may couple to both eyewear arms 1020a-b, and the cleaning cloth can be coupled to, and wrap around, the single retainer arm. While the eyewear 1010 in FIG. 10 is illustrated as sunglasses, an eyewear retainer 1000 can be used with any type of eyewear (e.g., prescription glasses or goggles). In some aspects, the eyewear retainer 1000 can include the eyewear 1010 and the eyewear retainer 1000 can be manufactured with the eyewear 1010 as a single contiguous component.

Figure 11:
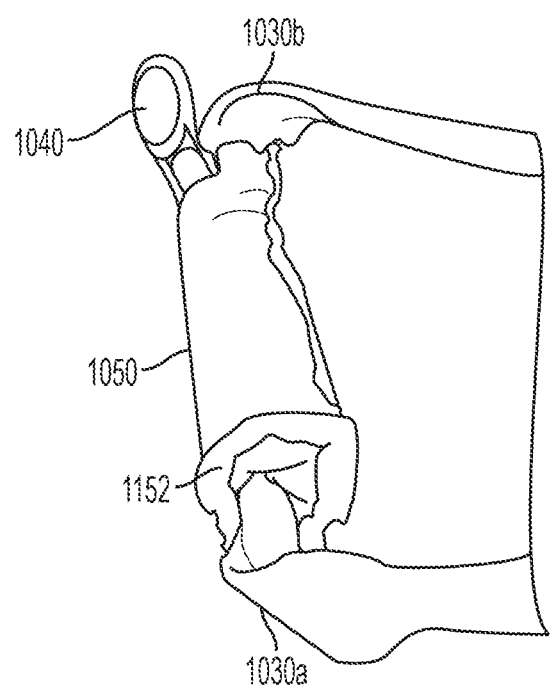
FIG. 11 is a perspective view of a slideable cloth housing for the cleaning cloth according to one aspect of the present disclosure.

FIG. 11 is a perspective view of the cloth housing 1050 in FIG. 10. The cloth housing 1050 is in the protective position around the cleaning cloth 1152. The openings in the cloth housing 1050 are substantially constricted such that an inner chamber, housing the cleaning cloth 1152, is substantially protected. The cleaning cloth 1152 is coupled to both retainer arms 1030a-b that extend partially into the openings in the cloth housing 1050. The cloth housing 1050 is movable to a second position such that the cloth housing 1050 is around a portion of either retainer arm 1030a-b rather than the cleaning cloth 1152. A tab 1040 is coupled to the cloth housing 1050 for facilitating the movement of the cloth housing 1050 between a protective position of the cleaning cloth 1152 and a revealing position of the cleaning cloth 1152. Although the tab 1040 is illustrated as extending from one end of the cloth housing 1050, the tab 1040 can extend from any portion of the cloth housing 1050. In some aspects, more than one tab 1040 may extend from the cloth housing 1050. In additional or alternative aspects, an opening in the cloth housing 1050 can enlarge while the tab 1040 is being pulled to allow the cleaning cloth 1152 to pass therethrough.

Figure 12:
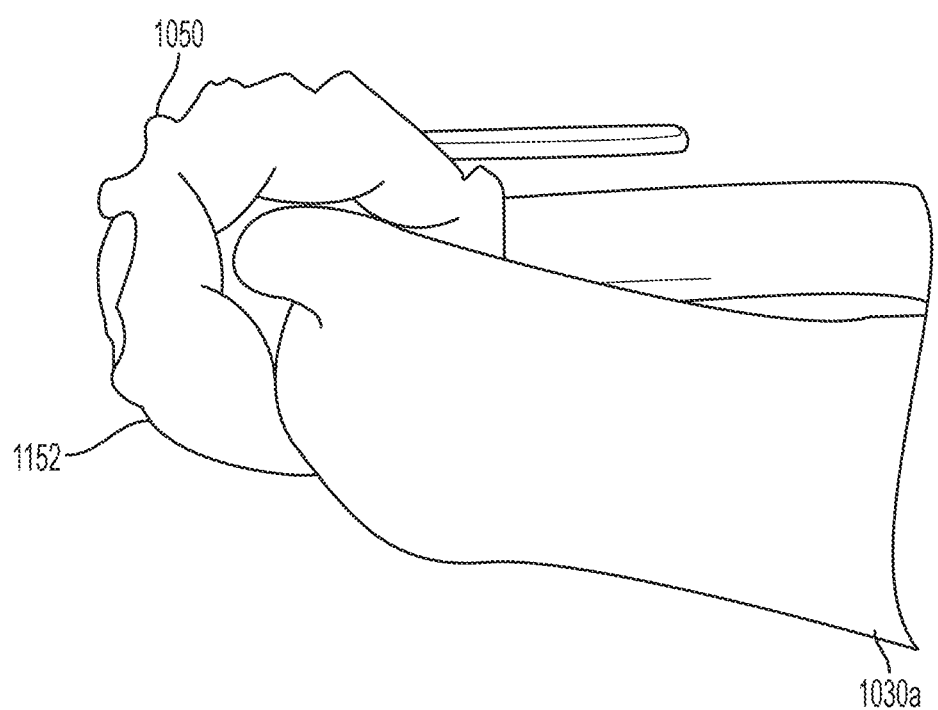
FIG. 12 is a side view of a slideable cloth housing for the cleaning cloth according to one aspect of the present disclosure.

FIG. 12 is a side view of the cloth housing 1050 in FIGS. 10-11. One opening of the cloth housing 1050 is shown constricted around a junction between a retainer arm 1030a and the cleaning cloth 1152 such that the cleaning cloth 1152 is substantially protected in the inner chamber of the cloth housing 1050. In some aspects, the cloth housing 1050 can be a water resistant material that can substantially seal the cleaning cloth 1152 from moisture and other liquids. For example, the cloth housing 1050 can be made of neoprene and the cloth housing 1050 can wrap around the cleaning cloth 1152 to create a protective barrier. In some aspects, the openings may include flaps that can flex to allow the cloth housing 1050 to be moved but can reseal the inner chamber after being moved.

Although FIGS. 10-12 illustrate the cloth housing 1050 as a slidable cylinder, the cloth housing 1050 can be any shape. In some aspects, the cloth housing 1050 can include a portion that separates such that the cloth housing 1050 can unwrap from around the cleaning cloth 1152. In additional or alternative aspects, the cloth housing 1050 can be one surface of the cleaning cloth 1152.

Figure 13:
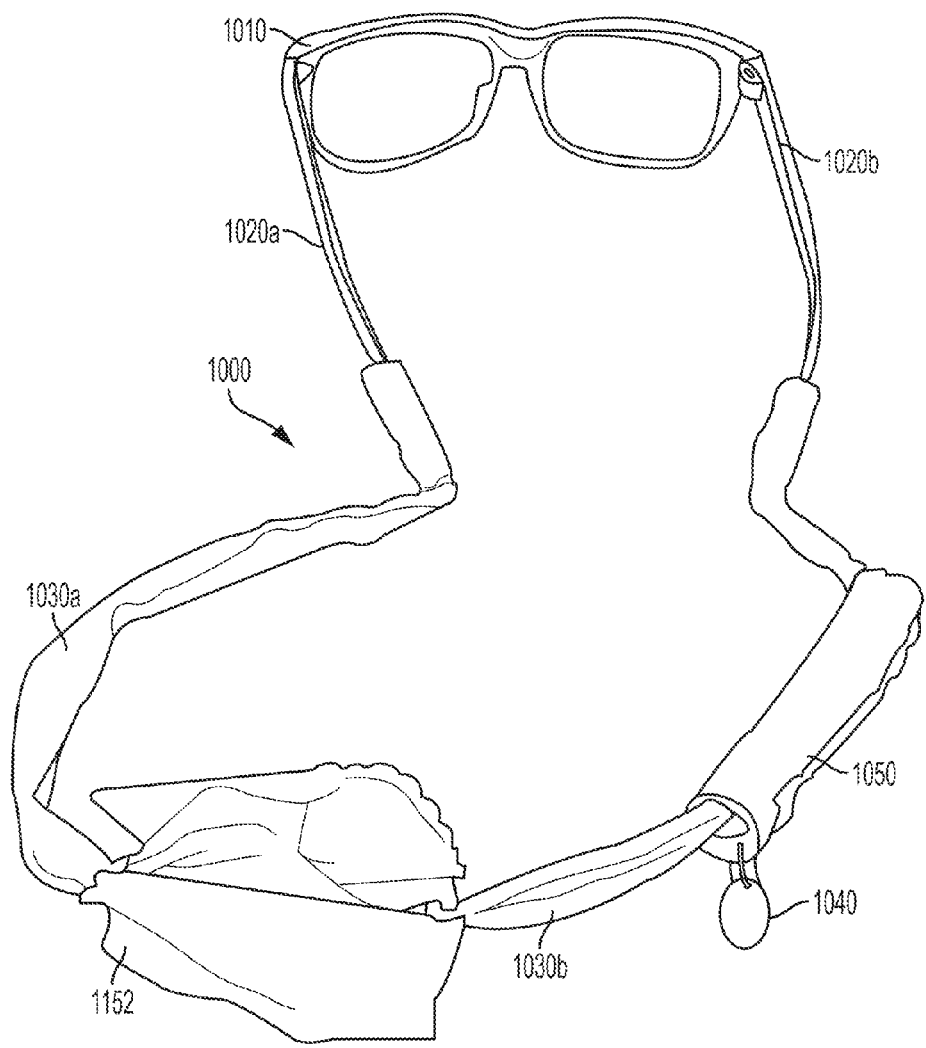
FIG. 13 is a perspective view of an eyewear retainer including a slideable cloth housing with a revealed cleaning cloth according to one aspect of the present disclosure.

FIG. 13 is a perspective view of the eyewear retainer 1000 with a revealed cleaning cloth 1152. The eyewear retainer 1000 includes two retainer arms 1030a-b coupled to eyewear arms 1020a-b of the eyewear 1010 and to the cleaning cloth 1152 such that a loop is created for holding the eyewear 1010 on a wearer. The cloth housing 1050 includes a tab 1040 for facilitating movement of the cloth housing 1050 between a protective position and a second position. The cloth housing 1050 is positioned in the second position such that a portion of one of the retainer arms 1030*a-b* passes through the housing and the cleaning cloth 1152 is revealed for cleaning the eyewear 1010.

Figure 14:
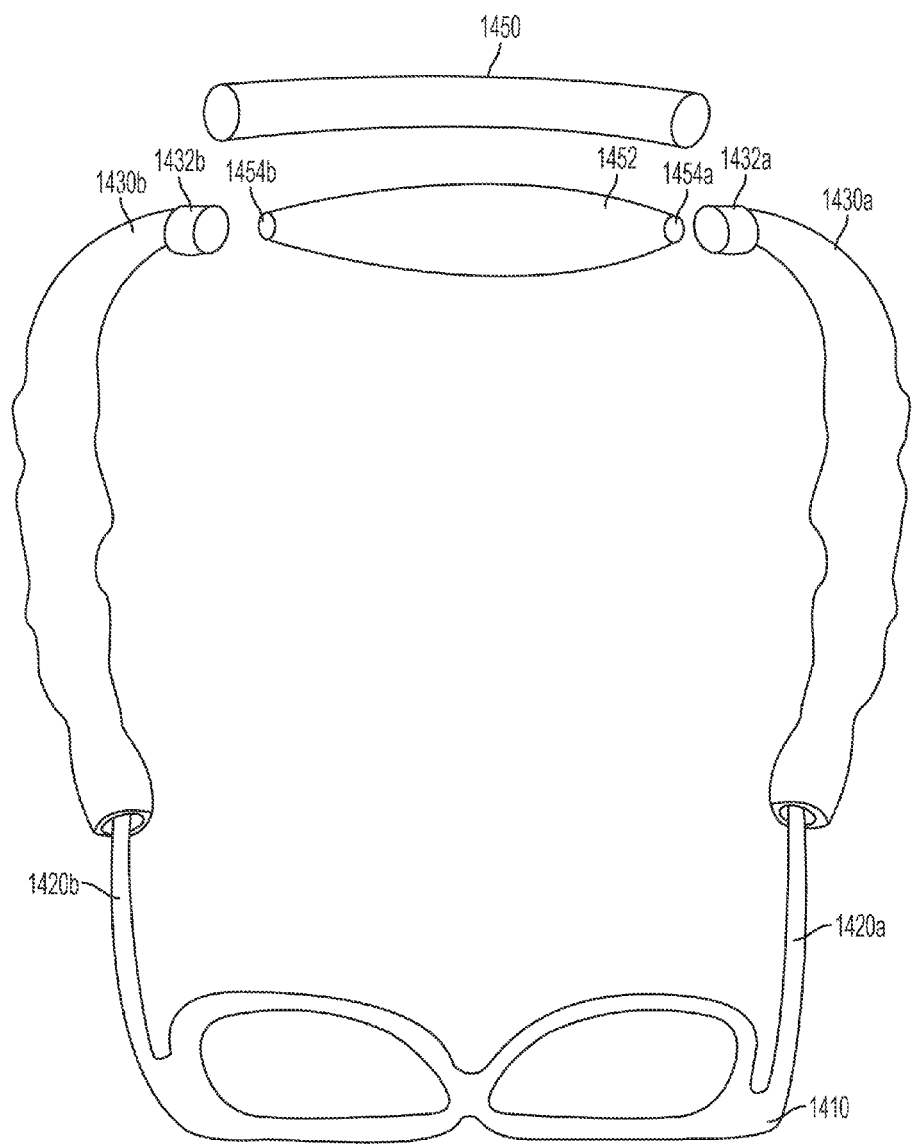
FIG. 14 is an exploded perspective view of an eyewear retainer including a ball-and-socket mechanism for coupling a cleaning cloth between two retainer arms according to one aspect of the present disclosure.

FIG. 14 is an exploded perspective view of an example of an eyewear retainer 1400 with a ball and joint mechanism for coupling a cleaning cloth 1452 between two retainer arms 1430*a-b*. The retainer arms 1430*a-b* include one end that can couple to an eyewear arm 1420*a-b* of an eyewear 1410 and another end with a joint 1432*a-b* for coupling to the cleaning cloth 1452 using a ball-and-socket mechanism. The cleaning cloth 1452 includes two balls 1454*a-b* for coupling to the joints 1432*a-b* of the retainer arms 1430*a-b*. In some aspects, the ball 1454*a-b* and joint 1432*a-b* can be magnetic for facilitating the ball-and-socket coupling. In additional or alternative aspects, a single ball-and-socket mechanism may be used for coupling the cleaning cloth 1452 to a retainer arm 1430*a* and a different coupling mechanism may be used for coupling the cleaning cloth 1452 to the other retainer arm 1430*b*. A neoprene cover 1450 can be slid around the cleaning cloth 1452 to protect the cleaning cloth 1452 and slid around a portion of one of the retainer arms 1430*a-b* to reveal the cleaning cloth 1452.

Figure 15:
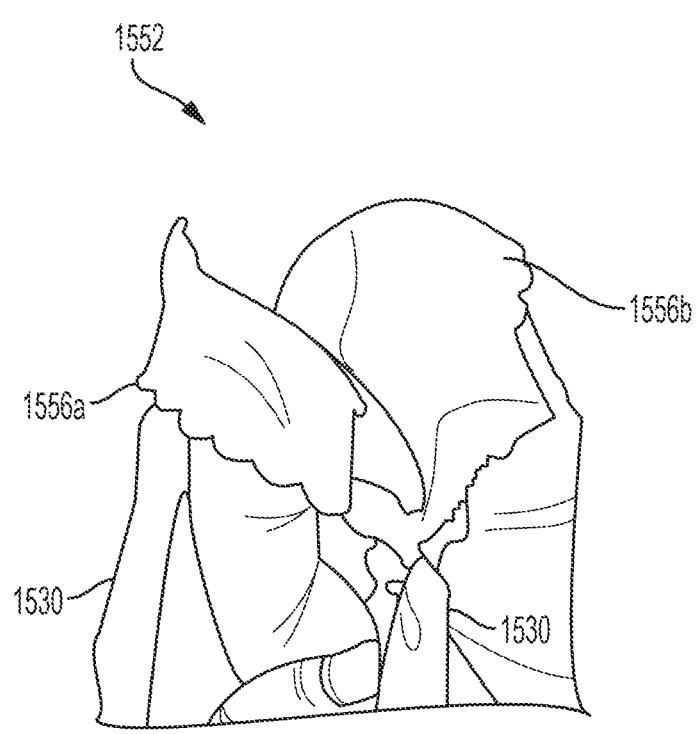
FIG. 15 is a perspective view of a cleaning cloth with two pockets according to one aspect of the present disclosure.

FIG. 15 is a perspective view of a cleaning cloth 1552 with two pockets 1556*a-b*. The cleaning cloth 1552 can be used with any of the eyewear retainer 100, 1000, 1400 described above. The openings to the pockets 1556*a-b* are located on opposite edges and retainer arms 1530 are coupled to a portion of the cleaning cloth 1552 between the two pockets 1556*a-b*. The pockets 1556*a-b* can allow one or more fingers of a user to be inserted therein such that a section of the cleaning cloth 1552 can be pinched between the fingers. The user can also pinch an eyewear (e.g., eyewear 110 in FIG. 1) with the fingers facilitating the cleaning of the eyewear with the cleaning cloth 1552 by allowing pressure to be applied to two sides of the eyewear.

Figure 16:
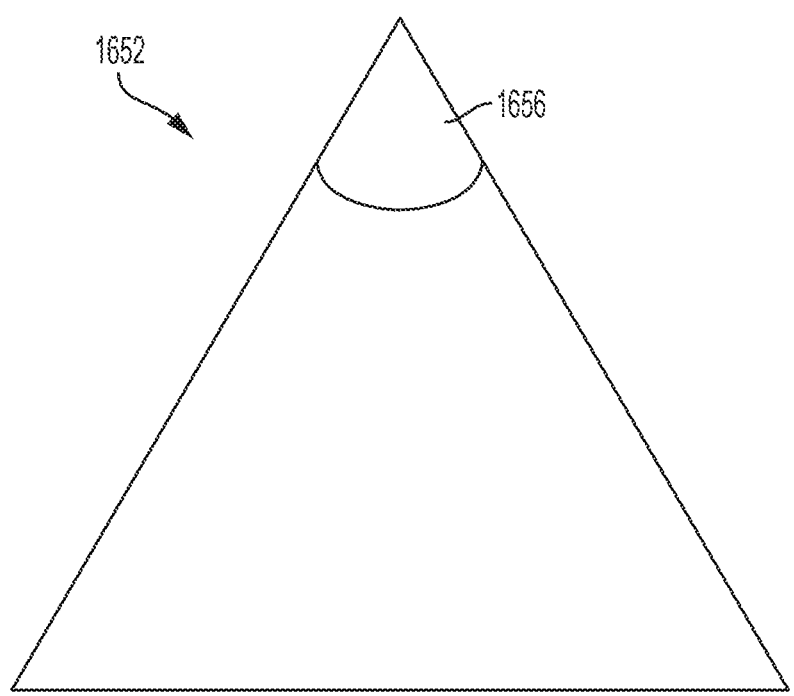
FIG. 16 is a top view of a cleaning cloth with a pocket according to one aspect of the present disclosure.

FIG. 16 is a top view of a cleaning cloth 1652 with a pocket 1656. The cleaning cloth 1652 can be used with any of the eyewear retainer 100, 1000, 1400 described above. The cleaning cloth 1652 is triangular with an opening of the pocket 1656 positioned at a first corner. The opening can allow one or more fingers of a user to be inserted into the pocket to facilitate cleaning an eyewear (e.g., the eyewear 110 in FIG. 1) with the cleaning cloth 1652. In some examples, the pocket 1656 can allow a user to apply greater pressure to a portion of the eyewear. In some aspects, the other two corners can each be attached to a retainer arm. In additional or alternative aspects, the edge opposite the first corner can be coupled to a retainer arm.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A wearable accessory, comprising:
a first retainer arm comprising:
a first side configured to couple to a first eyewear arm of a piece of eyewear; and
a second side having a first housing member;
a second retainer arm comprising:
a first side configured to couple to a second eyewear arm of the piece of eyewear; and
a second side having a second housing member; and
a cleaning cloth having a first end coupled to the first retainer arm and a second end coupled to the second retainer arm;
wherein the second housing member is movable between (i) a closed position in which the second housing member is coupled with the first housing member to define a chamber enclosing the cleaning cloth for protecting the cleaning cloth from an environment external to the chamber, and (ii) an open position in which the second housing member is separate from the first housing member to expose the cleaning cloth to the environment, wherein the second housing member is movable from the closed position to the open position by disconnecting the second housing member from the first housing member and moving the second housing member along a length of the cleaning cloth toward the first side of the second retainer arm;
wherein the first housing member includes a female portion having an inner area that partially defines the chamber in the closed position; and
wherein the second housing member includes a male portion having an inner area that partially defines the chamber in the closed position, the male portion being partially positionable in the inner area of the female portion in the closed position to frictionally seal the chamber and being independent from the female portion in the open position.

2. The wearable accessory of claim 1, wherein:
the female portion includes a depression in an inner surface; and
the male portion includes a projection extending from an outer surface of the male portion that is positioned in the depression of the female portion in the closed position.

3. The wearable accessory of claim 1, further comprising:
a first ball joint coupling the first end of the cleaning cloth to the first retainer arm; and
a second ball joint coupling the second end of the cleaning cloth to the second retainer arm.

4. The wearable accessory of claim 1, wherein the second housing includes a tubular cover configured to protect the cleaning cloth and in which the cleaning cloth is at least partially disposed in the closed position.

5. The wearable accessory of claim 1, wherein the cleaning cloth includes one or more pockets for allowing a user to insert a finger to facilitate cleaning the eyewear.

6. The wearable accessory of claim 1, wherein the first housing member and the second housing member comprise a waterproof material configured to substantially seal the cleaning cloth from moisture while in the closed position.

7. The wearable accessory of claim 1, further comprising a tab coupled to an outer surface of at least one of the first housing member or the second housing member for facilitating movement between the open position and the closed position.

8. The wearable accessory of claim 1, further comprising a buoyant material for causing the wearable accessory to float in water.

9. An accessory for eyewear, the accessory comprising:
a first retainer arm comprising:
a first side configured to couple to a first eyewear arm of a piece of eyewear; and
a second side having a first housing member;
a second retainer arm comprising:
a first side configured to couple to a second eyewear arm of the piece of eyewear; and
a second side having a second housing member; and a cleaning cloth having a first end coupled to the first retainer arm and a second end coupled to the second retainer arm;

wherein the first and the second housing members are movable between (i) a closed position in which the first and second housing members are coupled together to define a chamber enclosing the cleaning cloth for protecting the cleaning cloth from an environment external to the chamber, and (ii) an open position in which the first and second housing members are separated to expose the cleaning cloth to the environment, wherein the first and second housing members are movable from the closed position to the open position by disconnecting the first and second housing members from one another and moving the first and second housing members in opposite directions along a length of the cleaning cloth;

wherein the first housing member includes a female portion having an inner area that partially defines the chamber in the closed position; and wherein the second housing member includes a male portion having an inner area that partially defines the chamber in the closed position, the male portion being partially positionable in the inner area of the female portion in the closed position to frictionally seal the chamber and being independent from the female portion in the open position.

10. The accessory of claim 9, wherein:
the female portion includes a depression in an inner surface; and
the male portion includes a projection extending from an outer surface of the male portion that is positioned in the depression of the female portion in the closed position.

11. The accessory of claim 9, wherein the cleaning cloth includes:
a first ball positioned at the first end of the cleaning cloth and configured to mate with a first joint coupled to the first retainer arm such that the first ball and first joint collectively form a first ball joint; and
a second ball positioned at the second end of the cleaning cloth and configured to mate with a second joint coupled to the second retainer arm such that the second ball and second joint collectively form a second ball joint.

12. The accessory of claim 9, wherein the second housing member includes a tubular cover configured to protect the cleaning cloth and in which the cleaning cloth is at least partially disposed in the closed position.

13. The accessory of claim 12, wherein the first housing member also includes the tubular cover configured to protect the cleaning cloth and in which the cleaning cloth is at least partially disposed in the closed position.

14. An eyewear retainer comprising:
a first retainer arm comprising:
a first side configured to couple to a first eyewear arm of a piece of eyewear; and
a second side having a first housing member through which a first end of a cleaning cloth is coupled to an interior of the first retainer arm; and
a second retainer arm comprising:
a first side configured to couple to a second eyewear arm of the piece of eyewear; and
a second side having a second housing member through which a second end of the cleaning cloth is coupled to an interior of the second retainer arm;
wherein the second housing member is movable between (i) a closed position in which the second housing member is coupled with the first housing member to define a chamber enclosing the cleaning cloth for protecting the cleaning cloth from an environment external to the chamber, and (ii) an open position in which the second housing member is separate from the first housing member to expose the cleaning cloth to the environment, wherein the second housing member is movable to the open position by disconnecting the first housing member from the second housing member and moving the second housing member along a length of the cleaning cloth toward the first side of the second retainer arm;
wherein the first housing member includes a female portion having an inner area that partially defines the chamber in the closed position; and
wherein the second housing member includes a male portion having an inner area that partially defines the chamber in the closed position, the male portion being partially positionable in the inner area of the female portion in the closed position to frictionally seal the chamber and being independent from the female portion in the open position.

15. The eyewear retainer of claim 14, wherein:
the first housing member includes an inner surface that includes a depression; and
the second housing member includes an outer surface with a projection extending from the outer surface that is positionable in the depression of the female portion in the closed position.

16. The eyewear retainer of claim 15, wherein the female portion or the male portion includes an o-ring for sealing the chamber in the closed position.

17. The eyewear retainer of claim 14, wherein the cleaning cloth includes one or more pockets for allowing a user to insert a finger to facilitate cleaning the eyewear, wherein the first housing member and the second housing member comprise a waterproof material for substantially sealing the cleaning cloth from moisture while in the closed position.

* * * * *